(12) United States Patent
Kameyama et al.

(10) Patent No.: US 6,891,699 B2
(45) Date of Patent: May 10, 2005

(54) RECORDING MEDIUM DRIVE INCLUDING HEAD SLIDER HAVING PROTECTION PROTUBERANCE STANDING ON AIR BEARING SURFACE

(75) Inventors: Masaki Kameyama, Kawasaki (JP);
Kenrou Yamamoto, Kawasaki (JP);
Masaharu Sugimoto, Kawasaki (JP);
Yoshiharu Kasamatsu, Kawasaki (JP);
Toru Yokohata, Kawasaki (JP);
Kazuhiro Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 141 days.

(21) Appl. No.: 10/266,851

(22) Filed: Oct. 8, 2002

(65) Prior Publication Data

US 2003/0184915 A1 Oct. 2, 2003

(30) Foreign Application Priority Data

Mar. 28, 2002 (JP) ........................................ 2002-092520

(51) Int. Cl.[7] ................................................. G11B 5/60
(52) U.S. Cl. .................................. 360/235.7; 360/236.5
(58) Field of Search ............................ 360/235.7, 236.5

(56) References Cited

U.S. PATENT DOCUMENTS

| | | | | |
|---|---|---|---|---|
| 6,040,958 A | * | 3/2000 | Yamamoto et al. | 360/236.3 |
| 6,351,345 B1 | | 2/2002 | Kameyama | 360/263.3 |
| 6,424,494 B1 | | 7/2002 | Koishi | 360/235.6 |
| 6,445,542 B1 | * | 9/2002 | Levi et al. | 360/236.5 |
| 2001/0019467 A1 | | 9/2001 | Otsuka et al. | |
| 2001/0053046 A1 | | 12/2001 | Koishi | |
| 2002/0015262 A1 | | 2/2002 | Kanda | |

FOREIGN PATENT DOCUMENTS

| | | |
|---|---|---|
| CN | 1281577 A | 1/2001 |
| CN | 1307330 A | 8/2001 |
| JP | 10-247368 | 9/1998 |
| JP | 10-302238 | 11/1998 |
| JP | 2000-268316 | 9/2000 |
| JP | 2001-148174 | 5/2001 |
| WO | 99/09547 | 2/1999 |

* cited by examiner

*Primary Examiner*—A. J. Heinz
(74) *Attorney, Agent, or Firm*—Greer, Burns & Crain, Ltd.

(57) ABSTRACT

A protection film is layered over the trailing or outflow end surface of a slider body in a head slider for a recording medium drive. A head element is embedded within the protection film. The head element generates heat in response to the supply of an electric current. The heat causes thermal expansion of the protection film. The tip end of the head element thus excessively approaches the recording disk beyond the medium-opposed surface of the head slider. The flying height of a protection protuberance is set smaller than a flying height of the head element even when the protection film suffers from thermal expansion. The protection protuberance is allowed to trace an orbit closer to the recording medium than the orbit of the head element. The protection protuberance is allowed to collide against obstacles on the recording medium in front of the head element.

16 Claims, 8 Drawing Sheets

RECORDING MEDIUM DRIVE INCLUDING HEAD SLIDER HAVING PROTECTION PROTUBERANCE STANDING ON AIR BEARING SURFACE

BACKGROUND OF THE INVENTION

1. Field of the Invention

The present invention relates to a recording medium drive or storage device realizing recordation and/or reproduction of information data with respect to a recording medium such as a magnetic recording disk, for example. In particular, the invention relates to a head slider supporting a head element within the aforementioned recording medium drive.

2. Description of the Prior Art

A magnetoresistive (MR) film is widely utilized to read out magnetic information out of a hard disk or magnetic recording disk in a hard disk drive (HDD), for example. The MR film is allowed to receive a magnetic field leaking out of the magnetic recording disk. The electric resistance of the MR film varies in response to the direction of the magnetic flux established in the magnetic field. Binary information data can be discriminated based on the variation in the electric resistance of the MR film.

Obstacles such as protrusions and contaminations may sometimes exist on the surface of the magnetic recording disk. If the MR film collides against a contamination on the rotating magnetic recording disk, the MR film suffers from so-called thermal asperity. As conventionally known, the thermal asperity may hinder the MR film from accurately reading the binary information data.

In general, a thin film coil pattern is utilized to write magnetic information data into the magnetic recording disk in the HDD. When an electric current is supplied to the thin film coil pattern, a magnetic field is induced at the thin film coil pattern. The induced magnetic field is led toward the surface of the magnetic recording disk. A proper magnetization is established in the magnetic recording disk in response to the application of the magnetic field. As the frequency of the information data signal for recordation gets higher, the thin film coil pattern generates a larger quantity of heat.

The aforementioned MR film and thin film coil pattern are both embedded in a protection film of $Al_2O_3$, for example, layered over a trailing or outflow end surface of a slider body. The protection film has a thermal expansion coefficient that is larger than the thermal expansion coefficient of the slider body. The heat from the thin film coil pattern causes thermal expansion of the protection film. The protection film largely swells toward the magnetic recording disk. The MR film excessively approaches the magnetic recording disk in this manner. As a result, the MR film suffers from a larger probability of collision against obstacles existing on the magnetic recording disk.

SUMMARY OF THE INVENTION

It is accordingly an object of the present invention to provide a recording medium drive and a head slider capable of reliably preventing collision between a head element and protrusions or contaminations existing on a recording medium. In particular, it is an object of the present invention to provide a recording medium drive and a head slider capable of reliably preventing collision between a head element and protrusions or contaminations existing on a recording medium even when the frequency of the information data signal for recordation gets higher.

According to a first aspect of the present invention, there is provided a recording medium drive comprising: a recording medium; a head slider opposing a medium-opposed surface to the recording medium and taking a predetermined flying attitude during flight above the recording medium; a protection film layered over the trailing end surface of a slider body within the head slider; a head element embedded within the protection film and opposing the tip end to the recording medium; and a protection protuberance standing on the medium-opposed surface closer to the leading end of the head slider than the head element, wherein said protection protuberance flies above the recording medium by a flying height smaller than a flying height established by the head element when thermal expansion is induced in the protection film.

When a predetermined relative movement is induced between the recording medium and the head slider, the head slider is allowed to fly above the surface of the recording medium. When the speed of the relative movement enters the steady status, the trailing end of the slider body is kept distanced from the surface of the recording medium by a predetermined flying height. During this flight, the head element is allowed to read and/or write information data from and into the recording medium.

When effecting read and/or write operations, an electric current is supplied to the head element. Heat is generated in the head element in response to the supply of the electric current. The generated heat causes thermal expansion of the protection film. The protection film largely swells toward the surface of the recording medium. The tip end of the head element excessively approaches the recording disk beyond the medium-opposed surface. The smaller flying height is in this manner established between the head element and the surface of the recording medium. The head element is forced to trace the orbit nearer to the recording medium than the orbit of the trailing end of the slider body.

The flying height of the protection protuberance is set smaller than the smaller flying height of the head element in the recording medium drive of the first aspect. Accordingly, the protection protuberance is allowed to trace an orbit closer to the recording medium than the orbit of the head element even when the protection film suffers from thermal expansion. Even if any obstacles such as protrusions and contaminations exist on the surface of the recording medium, the protection protuberance is allowed to collide against the obstacles in front of the head element. In this manner, the head element can reliably be prevented from collision against obstacles behind the protection protuberance.

The aforementioned protection protuberance may be formed on an air bearing surface defined within the medium-opposed surface of the head slider. The tip end of the head element is usually exposed at the air bearing surface. The air bearing surface may be established on a rail formed in the medium-opposed surface. In addition, a step may be defined between the top surface of the rail and the leading or inflow end of the air bearing surface. A support protrusion may also be formed in the medium-opposed surface of the head slider. Such a support protrusion should define the top higher than the protection protuberance.

The protection protuberance may get smaller in the lateral direction as approaching the leading end of the head slider. Specifically, a front wall surface may be defined on the protection protuberance. This front wall surface extends at least from a front datum line perpendicular to the medium-opposed surface to a rear datum line perpendicular to the medium-opposed surface at a position closer to the trailing end surface than the front datum line. Otherwise, first and second front wall surfaces may be defined on the protection protuberance. The first and second front wall surfaces respectively extend from first and second datum lines both perpendicular to the medium-opposed surface to a third datum line perpendicular to the medium-opposed surface at a position closer to the leading end of the head slider than the first and second datum lines.

With the protection protuberances of these types, contaminations never collide against the wall surfaces of the protection protuberances in the perpendicular direction. Contaminations are allowed to easily bounce against the front wall surfaces of the protection protuberances out of the orbit of the head element. Collision can thus be avoided between the head element and contaminations. If a contamination collides against the front wall surface of the protection protuberance in the perpendicular direction, the contamination tends to get jammed between the head slider and the surface of the recording medium. The contamination thus tends to collide against the head element.

The protection protuberance may be located within a depression defined in an air bearing surface over the medium-opposed surface. For example, when the head slider is received on the surface of the recording medium by the trailing edge of the head slider, the protection protuberance is allowed to contact the surface of the recording medium prior to the contact of the air bearing surface with the recording medium. The protection protuberance serves to avoid contact between the air bearing surface and the recording medium. Any increase in the contact area can be prevented between the head slider and the recording medium in this manner. In addition, the protection protuberance is allowed to stand from the position lower than the level of the air bearing surface. The height of the protection protuberance can substantially be increased without increasing the flying height of the head slider. This serves to prevent a lubricating agent or moisture, spreading over the surface of the recording medium, from going up toward the air bearing surface. It is thus possible to reliably prevent generation of a meniscus effect of the lubricating agent as well as any increase in a frictional force between the head slider and the recording medium.

Furthermore, the size of the protection protuberance is preferably set enough to block airflow directed to the head element over the entire range of the incident angle of the airflow. The incident angle may be variable because of change in the flying attitude of the head slider. In this case, the protection protuberance is allowed to always collide against obstacles in front of the head element, even when contaminations enter the medium-opposed surface of the head slider by any incident angle. The head element can reliably be protected from collisions.

According to a second aspect of the present invention, there is provided a head slider comprising: a slider body; a protection film layered over the trailing end surface of the slider body; a head element embedded within the protection film and exposing the tip end at an air bearing surface; and a protection protuberance standing on the air bearing surface closer to the leading end of the slider body than the head element, wherein said protection protuberance gets smaller in the lateral direction as approaching the leading end of the slider body.

In addition, according to a third aspect of the present invention, there is provided a head slider comprising: a slider body; a protection film layered over the trailing end surface of the slider body; a head element embedded within the protection film and exposing the tip end at an air bearing surface; and a protection protuberance standing on the air bearing surface closer to the leading end of the slider body than the head element, wherein a front wall surface is defined on the protection protuberance, said front wall surface extending from a front datum line perpendicular to the air bearing surface to a rear datum line perpendicular to the air bearing surface at a position closer to the trailing end surface than the front datum line.

Furthermore, according to a fourth aspect of the present invention, there is provided a head slider comprising: a slider body; a protection film layered over the trailing end surface of the slider body; a head element embedded within the protection film and exposing the tip end at an air bearing surface; and a protection protuberance standing on the air bearing surface closer to the leading end of the slider body than the head element, wherein first and second front wall surfaces are defined on the protection protuberance, said first and second front wall surfaces respectively extending from first and second datum lines both perpendicular to the air bearing surface to a third datum line perpendicular to the air bearing surface at a position closer to the leading end of the slider body than the first and second datum lines.

Any of the aforementioned head sliders reliably prevents the front surface of the protection protuberance from receiving contaminations in the perpendicular direction. Contaminations are allowed to easily bounce against the front wall surface of the protection protuberance out of the orbit of the head element. Collision can thus be avoided between the head element and contaminations. If a contamination collides against the front wall surface of the protection protuberance in the perpendicular direction, the contamination tends to get jammed between the head slider and the surface of the recording medium. The contamination thus tends to collide against the head element.

According to a fifth aspect of the present invention, there is provided a head slider comprising: a slider body; a protection film layered over the trailing end surface of the slider body; a head element embedded within the protection film and exposing the tip end at an air bearing surface; a depression defined in the air bearing surface at a position closer to the leading end of the slider body than the head element; and a protection protuberance standing within the depression on the slider body and defining the tip end protruding from the level of the air bearing surface.

For example, when the head slider is received on the surface of the recording medium by the trailing edge of the head slider, the protection protuberance is allowed to contact the surface of the recording medium prior to the contact of the air bearing surface with the recording medium. The protection protuberance serves to avoid contact between the air bearing surface and the recording medium. Any increase in the contact area can be prevented between the head slider and the recording medium in this manner. In addition, the protection protuberance is allowed to stand from the position lower than the level of the air bearing surface. The height of the protection protuberance can substantially be increased without increasing the flying height of the head slider. This serves to prevent a lubricating agent or moisture, spreading over the surface of the recording medium, from going up toward the air bearing surface. It is thus possible to reliably prevent generation of a meniscus effect of the lubricating agent as well as any increase in a frictional force between the head slider and the recording medium.

In any of the aforementioned head sliders, the size of the protection protuberance is preferably set enough to block airflow directed to the head element over the entire range of the incident angle of the airflow in the aforementioned manner. In this case, the protection protuberance is allowed to always collide against obstacles in front of the head element, even when contaminations enter the medium-opposed surface of the head slider by any incident angle. The head element can reliably be protected from collisions.

According to a sixth aspect of the present invention, there is provided a method of making a head slider, comprising: forming a protrusion on a medium-opposed surface of the head slider, said protrusion having a height larger than a predetermined height that is established when the head slider is incorporated into a product; opposing the medium-opposed surface of the head slider against the surface of a rotating abrasive disk; and allowing the head slider to approach the surface of the abrasive disk, a flying height of the head slider being set smaller than a predetermined flying height that is established when the head slider is incorporated into the product, so that the protrusion abrades because of contact between the protrusion and the abrasive disk.

In general, the head slider flies above the surface of a recording medium or abrasive disk exactly by a predetermined flying height based on the speed of the relative movement between the head slider and the abrasive disk. The flying height is set to determine the quantity of abrasion of the protrusion. The protrusion can be shortened to a predetermined height established by the predetermined flying height of the head slider. In the product, the flying height of the top of the protrusion can be set based on the difference between the predetermined flying height and a flying height established in the abrasion. The top of the protrusion is allowed to reliably keep the predetermined height above the surface of the recording medium.

In particular, the abrasive disk may rotate, when the protrusion gets abrasion, at a revolution speed smaller than a predetermined revolution speed that is established when the head slider is incorporated into the final product. The lift acting on the head slider can be reduced based on the revolution speed as compared with the case where the head slider is incorporated into the product. The head slider can be opposed to the abrasive disk by a flying height smaller than the flying height that is to be established when the head slider is incorporated into the product. In this manner, the quantity of the abrasion of the protrusion can be set appropriately.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
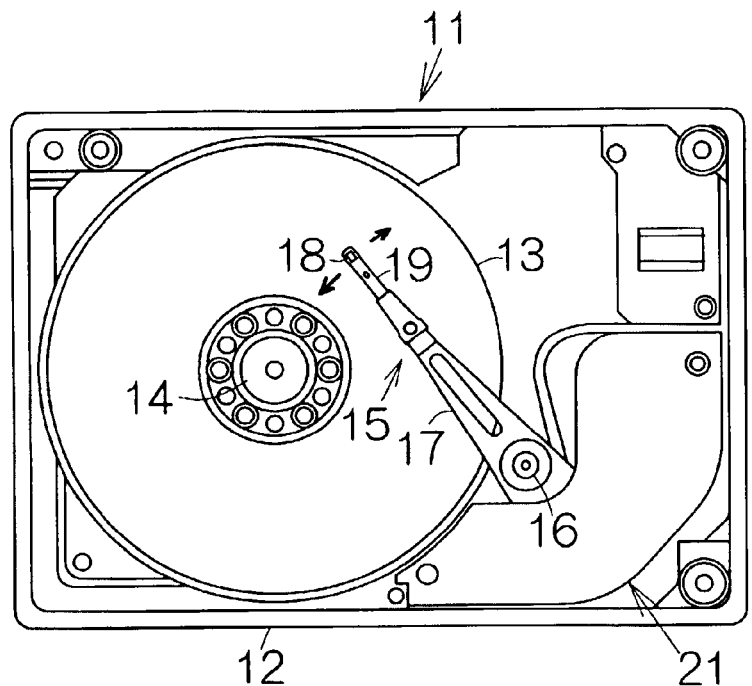
FIG. 1 is a plan view schematically illustrating the structure of a hard disk drive (HDD)

FIG. 1 schematically illustrates the inner structure of a hard disk drive (HDD) 11 as an example of a recording medium drive or storage device. The HDD 11 includes a box-shaped primary enclosure 12 defining an inner space of a flat parallelepiped, for example. At least one magnetic recording disk 13 is accommodated in the inner space within the primary enclosure 12. The magnetic recording disk 13 is mounted on a driving shaft of a spindle motor 14. The spindle motor 14 is designed to drive the magnetic recording disk 13 for rotation at a predetermined revolution speed such as 7,200 rpm or 10,000 rpm, for example. A cover, not shown, is coupled to the primary enclosure 12 so as to define the closed inner space between the primary enclosure 12 and itself.

A carriage 15 is also accommodated in the inner space of the primary enclosure 12. The tip or front end of the carriage 15 is opposed to the surface of the magnetic recording disk 13. The carriage 15 includes a rigid swinging arm 17 capable of swinging around a support shaft 16, and an elastic head suspension 19 fixed to the tip end of the swinging arm 17 so as to hold a flying head slider 18 at the tip end. An electromagnetic actuator 21 such as a voice coil motor (VCM) can be employed to realize the swinging movement of the swinging arm 17, for example. When the swinging arm 17 is forced to swing about the support shaft 16, the flying head slider 18 is allowed to cross the recording tracks defined on the magnetic recording disk 13 in the radial direction of the magnetic recording disk 13. This radial movement serves to position the flying head slider 18 right above a target recording track on the magnetic recording disk 13. As conventionally known, in the case where two or more magnetic recording disks 13 are incorporated within the inner space of the primary enclosure 12, a pair of the flying head sliders 18, namely, the head suspensions 19 are disposed between the adjacent magnetic recording disks 13.

Figure 2:
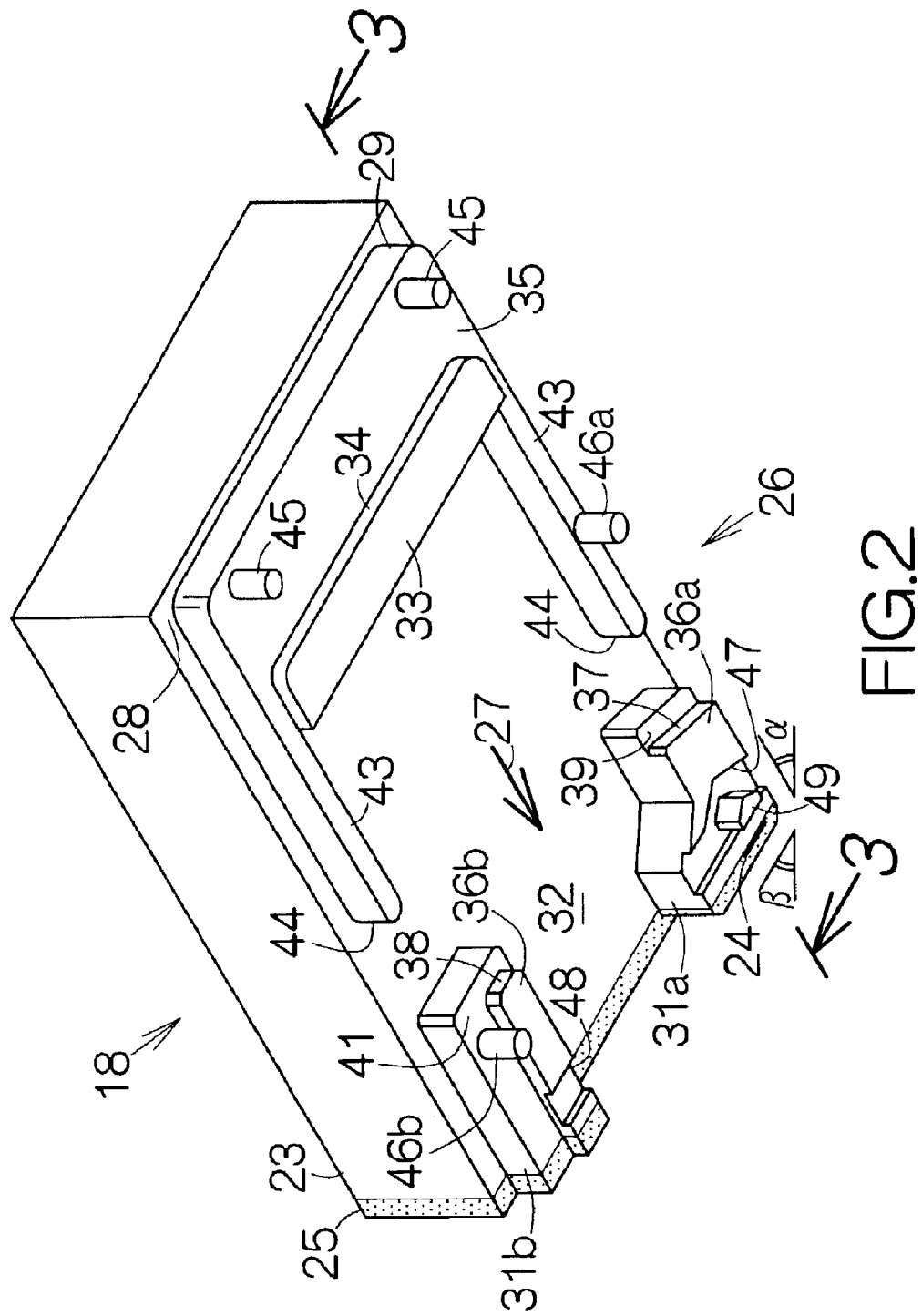
FIG. 2 is an enlarged perspective view schematically illustrating the structure of a flying head slider according to an example of the present invention.

FIG. 2 illustrates a specific example of the flying head slider 18 according to the present invention in detail. The flying head slider 18 includes a slider body 23 of a flat parallelepiped, for example, made of $Al_2O_3$—TiC, and a protection film 25, made of $Al_2O_3$, layered over the trailing or outflow end surface of the slider body 23. A read/write head 24 is contained within the protection film 25. The slider body 23 and the protection film 25 are designed to oppose a medium-opposed surface or bottom surface 26 to the magnetic recording disk 13. The bottom surface 26 is allowed to receive an airflow 27 generated along the surface of the rotating magnetic recording disk 13. Note that the terms "trailing" and "outflow" are defined based on the direction of the airflow 27.

A front rail 29 is formed to stand on a flat base surface 28 of the bottom surface 26 near the leading or inflow end of the slider body 23. The terms "leading" and "inflow" are defined based on the direction of the airflow 27 in the same manner as described above. The front rail 29 is designed to extend in the lateral direction of the slider body 23 in parallel with the leading end of the slider body 23. The term "lateral" is defined in the direction perpendicular to the direction of the airflow 27. The height of the front rail 29 from the base surface 28 may be set approximately at 1.5–2.0 $\mu$m, for example.

Likewise, a pair of rear rails 31a, 31b are formed to stand on the base surface 28 of the bottom surface 26 near the trailing or outflow end of the slider body 23. The rear rails 31a, 31b are arranged in a row in the lateral direction so as to define an airflow passage 32 for the airflow 27. The rear rails 31a, 31b are designed to extend downstream in the rearward direction toward the trailing end of the slider body 23. The height of the respective rear rails 31a, 31b from the base surface 28 may be set at a predetermined height equal to the aforementioned height of the front rail 29.

A front air bearing surface 33 in the form of a strip is defined on the top surface of the front rail 29. The front air bearing surface 33 is designed to extend in the lateral direction of the slider body 23. A step 34 is defined on the top surface of the front rail 29 at the leading or inflow end of the front air bearing surface 33. The step 34 may be formed all over the periphery of the front air bearing surface 33 except the trailing or outflow end thereof. The step 34 serves to define a lower level surface 35 extending over the top surface of the front rail 29 at a level lower than the front air bearing surface 33. The difference in height may be set at approximately 200 nm, for example, between the front air bearing surface 33 and the lower level surface 35. During rotation of the magnetic recording disk 13, the airflow 27 generated along the surface of the magnetic recording disk 13 is allowed to flow along the lower level surface 35, the step 34 and the front air bearing surface 33 in this sequence. The step 34 enables generation of a larger positive pressure or lift on the front air bearing surface 33.

First and second rear air bearing surfaces 36a, 36b are respectively defined on the top surfaces of the rear rails 31a, 31b. A step 37 is defined on the top surface of the rear rail 31a at the leading or inflow end of the first rear air bearing surface 36a. Likewise, a step 38 is defined on the top surface of the rear rail 31b at the leading or inflow end of the second rear air bearing surface 36b. The step 38 may be formed to extend along the periphery of the second rear air bearing surface 36b toward the trailing or outflow end of the second rear air bearing surface 36b. The steps 37, 38 serve to define lower level surfaces 39, 41 extending over the top surfaces of the rear rails 31a, 31b, respectively, at a level lower than the first and second rear air bearing surfaces 36a, 36b. The difference in height may be set at approximately 200 nm, for example, between the rear air bearing surfaces 36a, 36b and the lower level surfaces 39, 41. During rotation of the magnetic recording disk 13, the airflow 27 generated along the surface of the magnetic recording disk 13 is allowed to flow along the lower level surfaces 39, 41, the steps 37, 38 and the first and second rear air bearing surfaces 36a, 36b in this sequence. The steps 37, 38 enable generation of a larger positive pressure or lift on the first and second air bearing surfaces 36a, 36b, respectively.

The flying head slider 18 of this type allows generation of a larger positive pressure or lift on the front air bearing surface 33 rather than a combination of the first and second rear air bearing surfaces 36a, 36b. Accordingly, when the slider body 23 flies above the surface of the magnetic recording disk 13, the slider body 23 keeps the attitude of a pitch angle $\alpha$. The pitch angle $\alpha$ is defined as an inclined angle in the direction of the airflow 27, namely, in the longitudinal direction of the slider body 23. In addition, the first rear air bearing surface 36a is set smaller than the second rear air bearing surface 36b, so that a larger positive pressure or lift can be generated on the second rear air bearing surface 36b rather than the first rear air bearing surface 36a when the airflow 27 acts on the bottom surface 26 of the flying head slider 18. Accordingly, when the slider body 23 flies above the surface of the magnetic recording disk 13, the slider body 23 is allowed to keep the attitude of a roll angle $\beta$. The roll angle $\beta$ is defined as an inclined angle in a direction perpendicular to the direction of the airflow 27, namely, in the lateral direction of the slider body 23.

A read/write head 24 is designed to expose the tip end, namely, the read gap and the write gap at the first rear air bearing surface 36a. In this case, the exposed end of the read/write head 24 may be covered with a hard protection coating, such as a diamond-like-carbon (DLC) film and the like, at the first rear air bearing surface 36a. A combination of the pitch and roll angles $\alpha$, $\beta$ serves to minimize the distance between the trailing end of the first rear air bearing surface 36a and the surface of the magnetic recording disk 13. Since the read/write head 24 is located closer to the trailing end of the first rear air bearing surface 36a, the read/write head 24 can read and write magnetic information data into and out of the magnetic recording disk 13 in an efficient manner. The read/write head 24 may include a write element such as a thin film magnetic head utilizing a thin film coil pattern, for example, and a read element such as a giant magneto resistive (GMR) element, a tunnel-junction magneto resistive (TMR) element, and the like. The read element may include an electromagnetic transducer film, specifically, a magneto resistive (MR) film such as spin valve film or tunnel-junction film, extending in the lateral direction along the first rear air bearing surface 36a.

A pair of side rails 43 are formed to stand on the base surface 28 of the slider body 23. The respective side rails 43 are connected to the front rail 29 at its opposite ends in the lateral direction of the slider body 23 so as to extend toward the trailing end of the slider body 23. The side rails 43 are designed to prevent an airflow, which collides against the front rail 29 during rotation of the magnetic recording disk 13, from entering a space behind the front rail 29 even when the airflow flows around the opposite ends of the front rail 29. The airflow 27 flowing beyond the front rail 29 across the front air bearing surface 33 is thus easily expanded in the vertical direction upright to the surface of the magnetic recording disk 13. The expansion of the airflow 27 serves to generate a negative pressure behind the front rail 29. The aforementioned lift at the air bearing surfaces 33, 36a, 36b is balanced with the negative pressure so as to set the flying height of the flying head slider 18 above the surface of the magnetic recording disk 13. Recesses 44 are defined between the side rails 43 and the corresponding rear rails 31a, 31b, respectively. The recesses 44 serve to introduce the airflow having flowed around the opposite ends of the front rail 29 into the airflow passage 32 between the rear rails 31a, 31b. The side rails 43 define the top surfaces, respectively, leveled or flush with the lower level surface 35 on the front rail 29.

A pair of front support protrusions 45, namely, front adsorption prevention pads, are formed on the front rail 29 so as to stand on the lower level surface 35. The front support protrusions 45 are preferably located adjacent the leading end of the slider body 23 as close as possible. The front support protrusions 45 define the tip ends, respectively, located above the level of the front air bearing surface 33 as well as the first and second rear air bearing surfaces 36a, 36b.

Likewise, a first rear support protrusion 46a, namely, a rear adsorption prevention pad, is formed on the side rail 43 closer to the first rear air bearing surface 36a. The first rear support protrusion 46a is designed to stand on the top surface of the side rail 43. Additionally, a second rear support protrusion 46b, namely, a rear adsorption prevention pad, is formed on the rear rail 31b. The second rear support protrusion 46b is designed to stand on the lower level surface 41. The rear support protrusions 46a, 46b are located, rearward of the front support protrusions 45, at positions distanced from the trailing end of the bottom surface 26. The rear support protrusions 46a, 46b define the tip ends, respectively, located above the level of the front air bearing surface 33 as well as the first and second rear air bearing surfaces 36a, 36b, in the same manner as the aforementioned front support protrusions 45. The height of the rear support protrusions 46a, 46b may be set equal to that of the front support protrusions 45.

A depression, namely, a groove 47 is defined on the rear rail 31a rearward of the first rear support protrusion 46a. The groove 47 is designed to extend in the lateral direction of the slider body 23 in parallel with the trailing or outflow end of the slider body 23. The groove 47 is allowed to extend completely across the first rear air bearing surface 36a. The groove 47 is located closer to the leading or inflow end of the slider body 23 than the read/write head 24. Likewise, a groove 48 is defined on the rear rail 31b rearward of the second rear support protrusion 46b. The groove 48 is designed to extend in the lateral direction of the slider body 23 in parallel with the trailing or outflow end of the slider body 23. The groove 48 is allowed to extend completely across the second rear air bearing surface 36b. The width of the groove 47, 48 may be set in a range between 10 µm and 100 µm, while the depth of the groove 47, 48 may be set in a range between 5 nm and 10 nm, for example.

Figure 3:
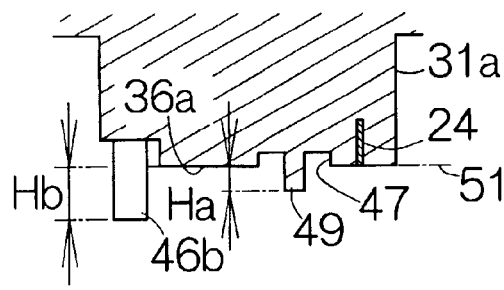
FIG. 3 is a part of the sectional view taken along the line 3—3 in FIG. 2.

A protection protuberance 49 is formed in the first rear air bearing surface 36a at a position closer to the leading end of the slider body 23 than the read/write head 24. The protection protuberance 49 is designed to rise from the first rear air bearing surface 36a. The protection protuberance 49 is located within the groove 47. As is apparent from FIG. 3, the protection protuberance 49 defines the tip end higher than the level of the first rear air bearing surface 36a. The protection protuberance 49 may be allowed to protrude from a provisional datum plane 51, including the first rear air bearing surface 36a by a height Ha=10 nm, for example. Note that the support protrusions 45, 46a, 46b are allowed to protrude from the provisional datum plane 51, including the air bearing surfaces 33, 36a, 36b by a height Hb=40 nm in this case.

Figure 4:
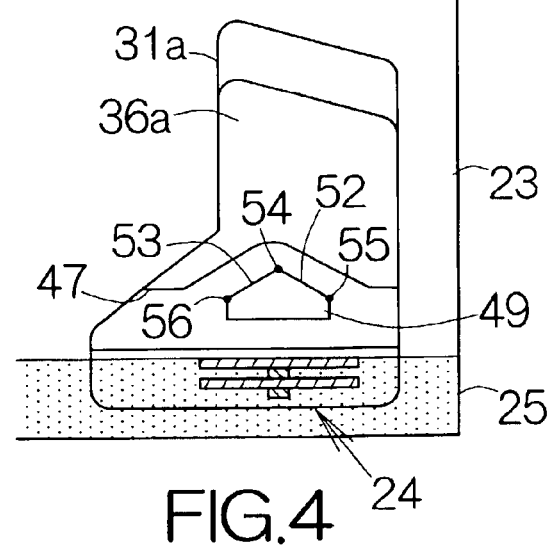
FIG. 4 is an enlarged plan view of the rear rail.

As is apparent from FIG. 4, the protection protuberance 49 is designed to get smaller in the lateral direction as approaching the leading end of the slider body 23. Specifically, first and second front wall surfaces 52, 53 are defined on the protection protuberance 49. The first and second front wall surfaces 52, 53 are allowed to stand upright from the first rear air bearing surface 36a. The first front wall surface 52 is defined between first and second ridges. The first ridge extends along a front datum line 54 perpendicular to the first rear air bearing surface 36a. The second ridge extends along a first rear datum line 55 perpendicular to the first rear air bearing surface 36a at a position rearward of and outside the front datum line 54. Likewise, the second front wall surface 53 is defined between the first ridge and a third ridge. The third ridge extends along a second rear datum line 56 perpendicular to the first rear air bearing surface 36a at a position rearward of and inside the front datum line 54. The term "inside" and "outside" is defined based on the magnetic recording disk 13 when the flying head slider 18 is opposed to the surface of the magnetic recording disk 13. The first front wall surface 52 is only required to include a flat plane extending in a provisional plane including at least the front and first rear datum lines 54, 55. Likewise, the second front wall surface 53 is only required to include a flat plane extending in a provisional plane including at least the front and second rear datum lines 54, 56. The first and second front wall surfaces 52, 53 need not always share the common ridge in the manner described above.

Figure 5:
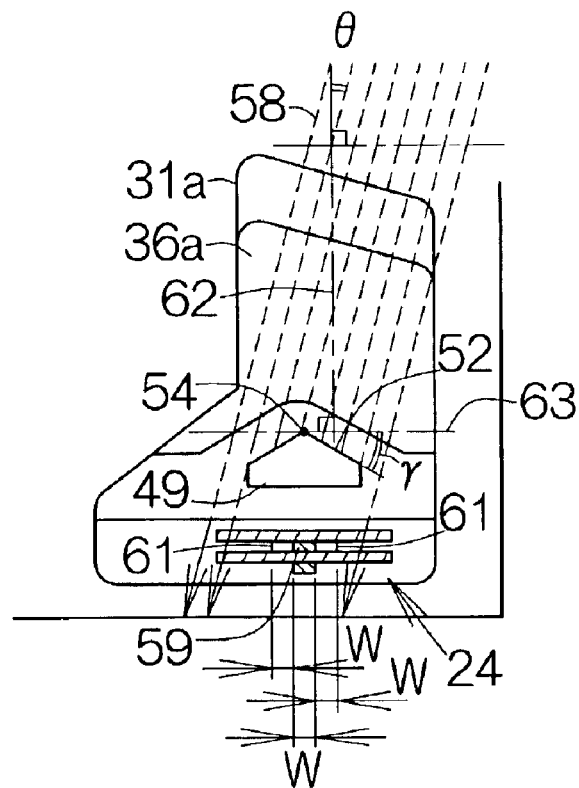
FIG. 5 is an enlarged plan view of the rear rail for schematically illustrating the relationship between a protection protuberance and airflow when the flying head slider is positioned above the outermost recording track.

As shown in FIG. 5, when the flying head slider 18 is positioned right above the outermost recording track on the rotating magnetic recording disk 13, the airflow 58 runs through the first rear air bearing surface 36a by the incident angle θ ranging approximately from 10 degrees to 20 degrees. Here, the size of the protection protuberance 49 is set large enough to completely block the airflow 58 running straight to the MR film 59 included in the read/write head 24. Moreover, the protection protuberance 49 is preferably designed to block the airflow 58 running straight to regions 61 adjacent to the MR film 59 by the width W of the MR film 59. The incident angle θ may be defined in the clockwise direction from a longitudinal datum line 62 defining the longitudinal direction or the front and rear of the flying head slider 18 on the plan view of the bottom surface 26.

As is apparent from FIG. 5, the first front wall surface 52 is designed to extend over a specific plane intersecting, at the front datum line 54, a vertical provisional plane 63 perpendicular to the longitudinal datum line 62. A cross angle γ larger than the absolute amount of the incident angle θ is established between the specific plane and the vertical provisional plane 63. Accordingly, the first front wall surface 52 is reliably prevented from receiving the airflow 58 in the perpendicular direction even when the airflow 58 enters the bottom surface 26 over the incident angle θ ranging from 0 degree to 20 degrees, for example.

Figure 6:
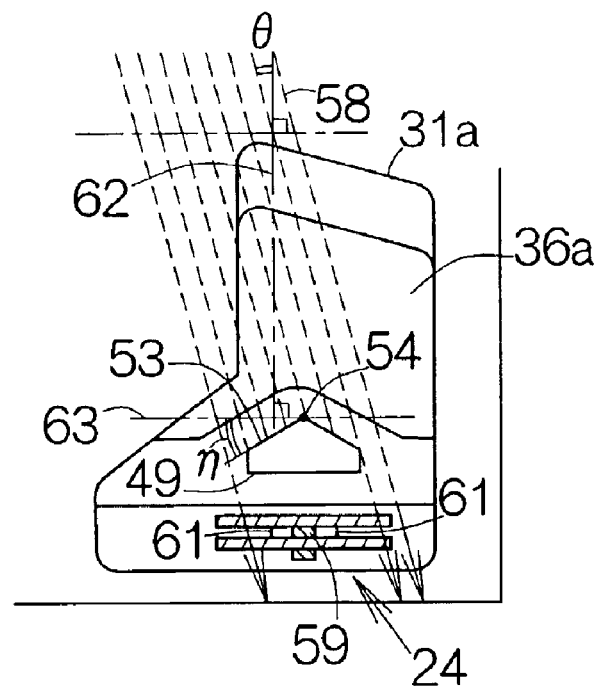
FIG. 6 is an enlarged plan view of the rear rail for schematically illustrating the relationship between the protection protuberance and airflow when the flying head slider is positioned above the innermost recording track.

As shown in FIG. 6, when the flying head slider 18 is positioned right above the innermost recording track on the rotating magnetic recording disk 13, the airflow 58 runs through the first rear air bearing surface 36a by the incident angle θ ranging approximately from −10 degrees to −20 degrees. Here, the size of the protection protuberance 49 is set large enough to completely block the airflow 58 running straight to the MR film 59 included in the read/write head 24. Moreover, the protection protuberance 49 is preferably designed to block the airflow 58 running straight to regions 61 adjacent to the MR film 59 by the width W of the MR film 59. In this manner, the protection protuberance 49 is allowed to reliably block the airflow 58 directed straight to the MR film 59 and the regions 61 over the entire range of the incident angle θ of the airflow 58, ranging from −20 degrees to 20 degrees, for example, entering the bottom surface 26.

As is apparent from FIG. 6, the second front wall surface 53 is designed to extend over a specific plane intersecting, at the front datum line 54, the vertical provisional plane 63 perpendicular to the longitudinal datum line 62. A cross angle η larger than the absolute amount of the incident angle θ is established between the specific plane and the vertical provisional plane 63. Accordingly, the second front wall surface 53 is reliably prevented from receiving the airflow 58 in the perpendicular direction even when the airflow 58 enters the bottom surface 26 over the incident angle θ ranging from −20 degrees to 0 degree, for example.

Figure 7:
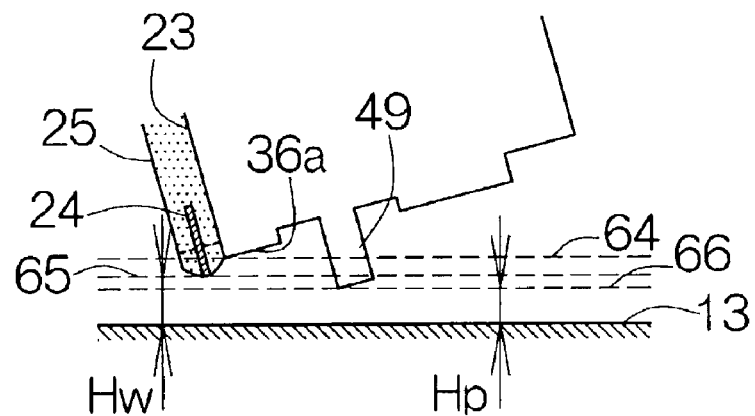
FIG. 7 is an enlarged partial side view of the flying head slider for schematically illustrating thermal expansion of a protection film.

Assume that airflow is generated along the surface of the rotating magnetic recording disk 13. When the flying head slider 18 is opposed against the surface of the magnetic recording disk 13, the airflow serves to generate a lift on the flying head slider 18. After the rotation of the magnetic recording disk 13 has entered the steady state, the trailing end or edge of the slider body 23 starts tracing a specific orbit plane 64 established in parallel with the surface of the magnetic recording disk 13, as shown in FIG. 7. As long as the set revolution speed is maintained for the rotation of the magnetic recording disk 13, the flying height of the slider body 23 can be kept constant above the surface of the magnetic recording disk 13.

An electric current for writing signals is then supplied to the read/write head 24. A magnetic field is induced at the thin film coil pattern included in the read/write head 24 in response to the supply of the electric current. The magnetic core serves to allow the induced magnetic field to leak out of the first rear air bearing surface 36a. The leaking magnetic field is utilized to write information data into the magnetic recording disk 13.

In this case, heat is generated at the thin film coil pattern in response to the supply of the electric current. The higher the frequency of the writing signals gets, the larger amount of the heat is generated at the thin film coil pattern. The generated heat of this kind causes thermal expansion of the protection film 25. As shown in FIG. 7, the protection film 25 largely swells toward the surface of the magnetic recording disk 13. The tip end of the read/write head 24 excessively approaches the magnetic recording disk 13 beyond the first rear air bearing surface 36a. In this manner, a specific smaller flying height Hw is established between the read/write head 24 (the MR film, in particular) and the magnetic recording disk 13. The tip end of the read/write head 24 starts tracing an orbit 65 nearer to the magnetic recording disk 13 than the orbit plane 64 for the trailing edge.

As is apparent from FIG. 7, the flying height Hp of the protection protuberance 49 is set smaller than the aforementioned specific smaller flying height Hw in the HDD 11. Accordingly, even when the thermal expansion is induced in the protection film 25, the tip or top of the protection protuberance 49 traces an orbit plane 66 closer to the magnetic recording disk 13 than the orbit 65 for the read/write head 24. Even if any obstacles such as protrusions or contaminations exist on the surface of the magnetic recording disk 13, the protection protuberance 49 is allowed to collide against the obstacles in front of the read/write head 24. In this manner, the read/write head 24 can reliably be prevented from colliding against obstacles behind the protection protuberance 49. A thermal asperity is reliably prevented from generating in the MR film 59.

In particular, the protection protuberance 49 is designed to completely block the airflow 58 headed straight toward the MR film 59 and the regions 61 even when the airflow 58 enters the bottom surface 26 over the various incident angles θ as described above. Specifically, the protection protuberance 49 is allowed to receive obstacles such as contaminations in front of the read/write head 24 over the entire range of the incident angle θ of the airflow 58. The read/write head 24 can reliably be protected from collision. According to the inventor's observation, it is confirmed that any collision of obstacles against the regions 61 adjacent the MR film 59 affects the MR film 59. Since the protection protuberance 49 is designed to protect not only the MR film 59 itself but also the regions 61 adjacent the MR film 59 from collision of contaminations, the protection of the MR film 59 can be reinforced.

In addition, even when contaminations enter the bottom surface 26 by any incident angle θ, the contaminations never collide against the first and second front wall surfaces 52, 53 in the perpendicular direction. The first and second front wall surfaces 52, 53 always receive contaminations in any directions other than the perpendicular direction. Contaminations are allowed to easily bounce inward or outward from the first and second front wall surfaces 52, 53. Collision can thus be avoided between the read/write head 24 and contaminations. If a contamination collides against the front wall surface 52, 53 in the perpendicular direction, the contamination tends to get jammed between the slider body 23 and the surface of the magnetic recording disk 13. The contamination thus tends to collide against the read/write head 24.

Next, assume that the flying head slider 18 contacts the surface of the magnetic recording disk 13. Normally, the slider body 23 can be supported by the support protrusions 45, 46a, 46b on the surface of the magnetic recording disk 13. The air bearing surfaces 33, 36a, 36b are prevented from contacting the surface of the magnetic recording disk 13. As compared with the case where the air bearing surfaces 33, 36a, 36b contact the surface of the magnetic recording disk 13, a smaller contact area can be established between the slider body 23 and the magnetic recording disk 13. The slider body 23 is prevented from receiving an adsorption or meniscus effect acting from a lubricating agent or oil film spreading over the surface of the magnetic recording disk 13.

Figure 8:
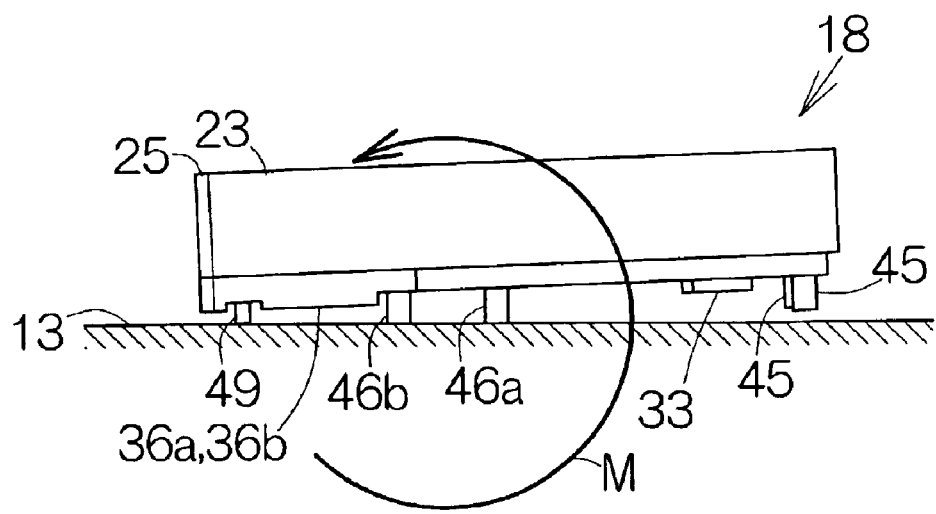
FIG. 8 is a side view of the flying head slider for schematically illustrating the contact between a magnetic recording disk and the flying head slider receiving a moment.

For example, assume that a moment M acts on the slider body 23 around the tip ends of the rear support protrusions 46a, 46b, as shown in FIG. 8. The moment M serves to distance the leading end or edge of the slider body 23 from the magnetic recording disk 13. If the flying head slider 18 contacts the surface of the magnetic recording disk 13 in this condition, the slider body 23 is received on the surface of the magnetic recording disk 13 by the rear support protrusions 46a, 46b while the front support protrusions 45 are kept distanced from the magnetic recording disk 13. At the same time, the tip end of the protection protuberance 49 is received on the magnetic recording disk 13 at the rear of the first rear support protrusion 46a. In this manner, any increase in the contact area can be prevented between the slider body 23 and the magnetic recording disk 13. Even if the trailing end or edge of the second rear air bearing surface 36b contacts the surface of the magnetic recording disk 13 at the rear of the second rear support protrusion 46b, the groove 48 serves to prevent the lubricating agent from going up to the second rear air bearing surface 36b. It is possible to reliably prevent generation of a meniscus effect of the lubricating agent as well as any increase in a frictional force between the slider body 23 and the magnetic recording disk 13.

Next, a brief description will be made on a method of making the aforementioned flying head slider 18. First of all, a wafer made of $Al_2O_3$—TiC is prepared. An alumina ($Al_2O_3$) film has been formed to cover over the surface of the wafer. A plurality of read/write heads 24 are formed over the surface of the alumina film in a conventional manner. A block is defined for the individual read/write head 24. The individual block is cut out into the individual flying head slider 18. The formed read/write heads 24 are covered with another alumina film. In this manner, the alumina film containing the read/write heads 24 is established on the wafer. The thickness of the alumina film may be set approximately at 50 µm, for example.

When the read/write heads 24 have been established on the wafer in the aforementioned manner, a so-called wafer bar is cut out from the wafer. The individual wafer bar is designed to include a row of the read/write heads 24. The cutting surface of the wafer bar is then subjected to formation of the bottom surfaces 26 of the flying head sliders 18 for the individual blocks. Thereafter, the individual block is cut off from the wafer bar into the individual flying head slider 18.

Figure 9:
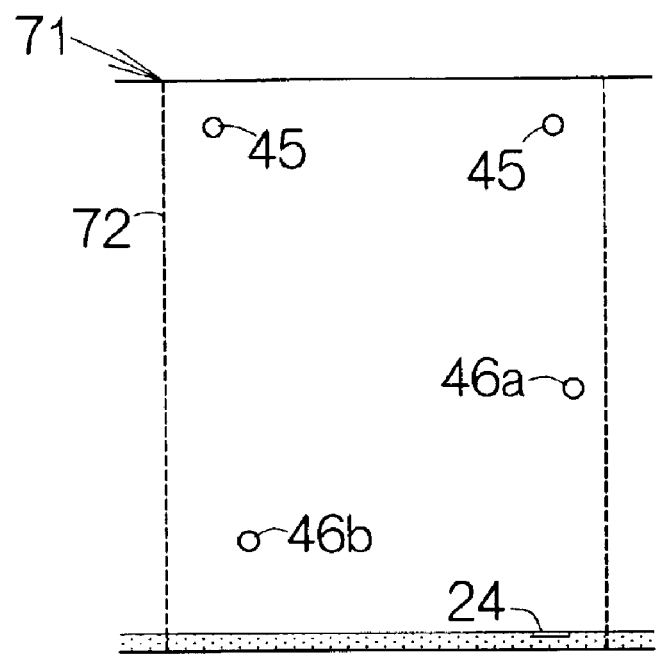
FIG. 9 is an enlarged partial plan view of a wafer bar for schematically illustrating the process of forming the tip portions of support protrusions.

As shown in FIG. 9, when the bottom surface 26 is to be shaped, the tip portions of the support protrusions 45, 46a, 46b are formed for the individual blocks 72 on the cutting surface of the wafer bar 71. Before establishment of the tip portions, a diamond-like carbon (DLC) film may be layered over the cutting surface of the wafer bar 71. An Si or SiC contact layer may be layered over the cutting surface before coverage of the DLC film. The DLC film serves to form hard protection layers over the tip ends of the support protrusions 45, 46a, 46b.

When forming the support protrusions 45, 46a, 46b, photoresist films, not shown, corresponding to the sectional shapes of the support protrusions 45, 46a, 46b, are formed on the cutting surface of the wafer bar 71. When the cutting surface of the wafer bar 71 is subjected to reactive ion etching (RIE), the material of the wafer bar 71 is scraped off around the photoresist films. As a result, the tip portions of the support protrusions 45, 46a, 46b remain under the photoresist films. The photoresist films are thereafter removed.

Figure 10:
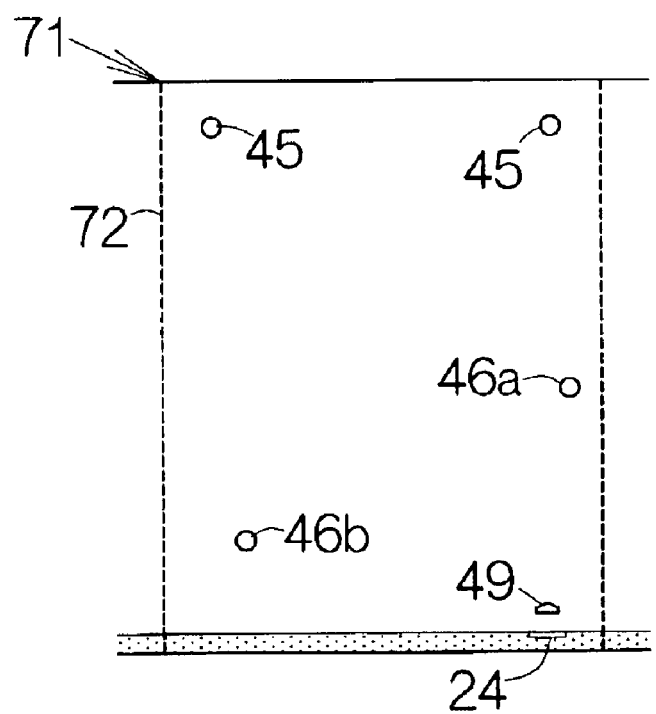
FIG. 10 is an enlarged partial plan view of a wafer bar for schematically illustrating the process of forming the remaining portions of support protrusions.

Subsequently, the protection protuberance 49 is formed on the cutting surface of the wafer bar 71, as shown in FIG. 10. A so-called lift-off is utilized in this case. The process of the lift-off will be described later in detail.

Figure 11:
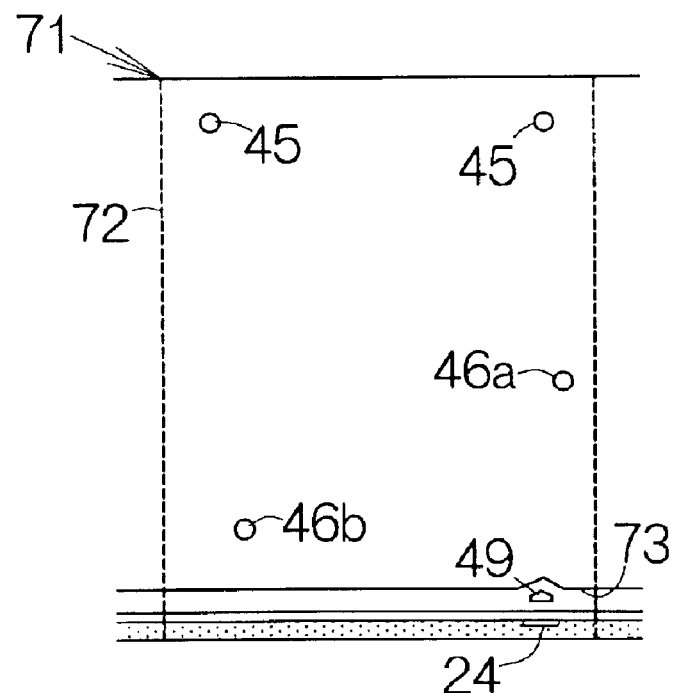
FIG. 11 is an enlarged partial plan view of a wafer bar for schematically illustrating the process of forming a groove.

As shown in FIG. 11, a groove 73 is defined on the wafer bar 71. The groove 73 is designed to extend across the block 72. The groove 73 is expected to result in the grooves 47, 48 of the flying head slider 18. A photoresist film, not shown, is formed on the cutting surface of the wafer bar 71. A void corresponding to the sectional shape of the groove 73 is defined in the photoresist film. In addition, the photoresist film remains to cover over the top surface of the protection protuberance 49 within the void. The cutting surface of the wafer bar 71 is then subjected to RIE, for example. The material of the wafer bar 71 is scraped off around the photoresist film. As a result, the groove 73 is obtained at the break of the photoresist film. The protection protuberance 49 remains within the groove 73. The photoresist film is thereafter removed.

Figure 12:
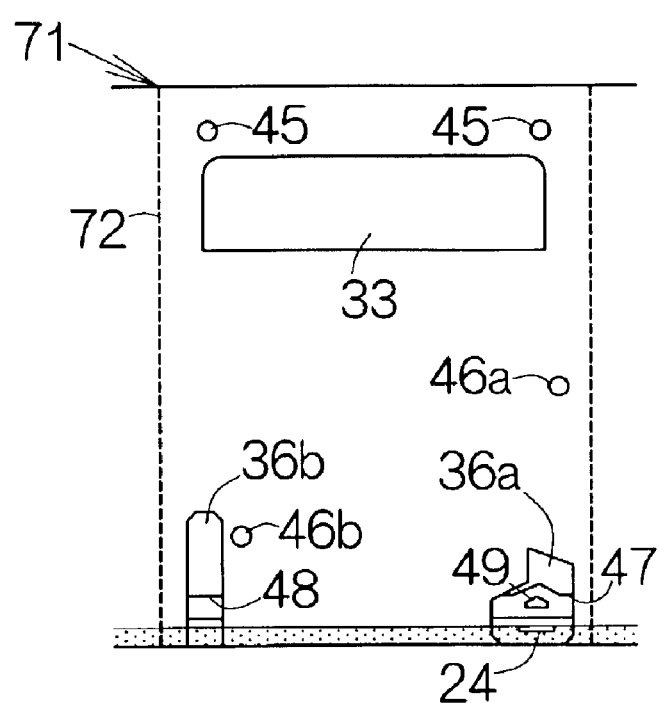
FIG. 12 is an enlarged partial plan view of a wafer bar for schematically illustrating the process of forming air bearing surfaces.

The air bearing surfaces 33, 36a, 36b are then formed over the cutting surface of the wafer bar 71, as shown in FIG. 12. Photoresist films, not shown, corresponding to the sectional shapes of the support protrusions 45, 46a, 46b, as well as photoresist films, not shown, corresponding to the shapes of the air bearing surfaces 33, 36a, 36b, are formed on the cutting surface of the wafer bar 71. The cutting surface of the wafer bar 71 is then subjected to RIE, for example. The material of the wafer bar 71 is scraped off around the photoresist films. As a result, the support protrusions 45, 46a, 46b and the air bearing surfaces 33, 36a, 36b are thus obtained under the photoresist films. The photoresist films are thereafter removed.

Finally, the front and rear rails 29, 31a, 31b are formed on the cutting surface of the wafer bar 71. Photoresist films, not shown, corresponding to the sectional shapes of the rails 29, 31a, 31b, are formed on the cutting surface of the wafer bar 71. The cutting surface of the wafer bar 71 is then subjected to RIE, for example. The material of the wafer bar 71 is scraped off around the photoresist films. As a result, the front rail 29 and the rear rails 31a, 31b are thus obtained under the photoresist films. The air bearing surfaces 33, 36a, 36b, the support protrusions 45, 46a, 46b and the protection protuberance 49 are allowed to remain on the top surfaces of the rails 29, 31a, 31b. The photoresist films are thereafter removed.

Figure 13:
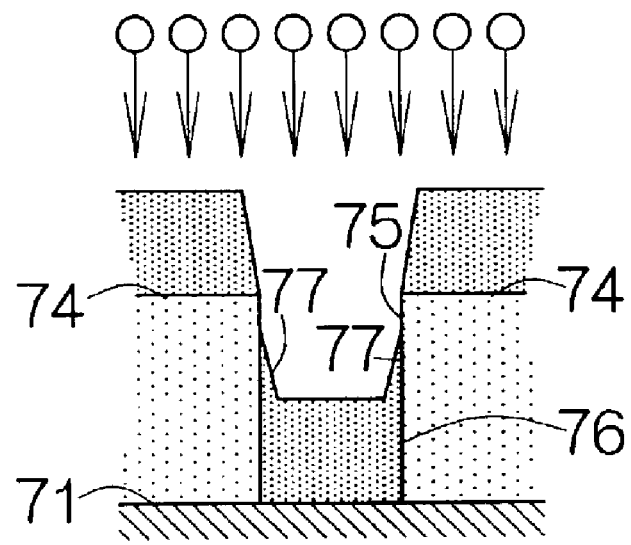
FIG. 13 is an enlarged partial sectional view of the wafer bar for schematically illustrating the process of a so-called lift-off in forming the protection protuberance.

As shown in FIG. 13, when the lift-off is conducted, the photoresist film 74 is formed over the cutting surface of the wafer bar 71. A void 75 corresponding to the shape of the protection protuberance 49 is defined in the photoresist film 74. In this case, the size of the void 75 is set slightly larger than the accurate periphery of the protection protuberance 49. Thereafter, a predetermined material is uniformly layered over the cutting surface of the wafer bar 71. Sputtering may be employed to make a layer of the material, for example. A material 76 for the protection protuberance 49 can be obtained within the void 75. A burr 77 may also be formed along the inner surface of the void 75. The burr 77 is expected to stand on the top surface of the material 76. The photoresist film 74 is thereafter removed. The material covering over the photoresist film 74 is also removed from the wafer bar 71.

Figure 14:
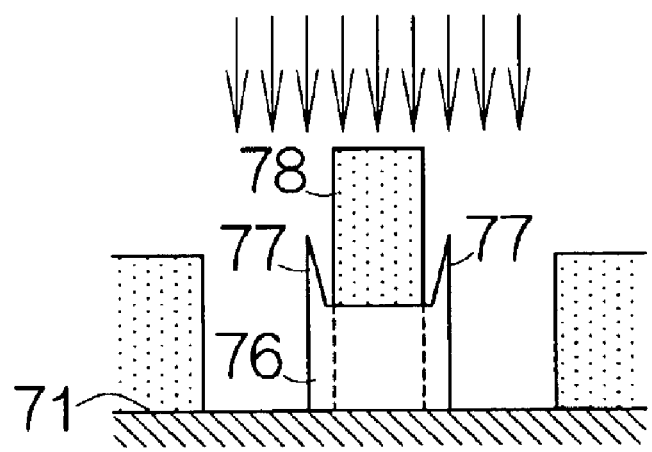
FIG. 14 is an enlarged partial sectional view of the wafer bar for schematically illustrating the process of forming the protection protuberance while the groove is formed.

As shown in FIG. 14, a photoresist film 78 is formed on the top surface of the material 76 when the groove 73 is to be formed. This time, the photoresist film 78 exactly corresponds to the shape of the protection protuberance 49. When RIE is effected in the aforementioned manner, the material 76 is removed around the photoresist film 78. The burr 77 can be removed in this manner. The protection protuberance 49 is allowed to remain on the cutting surface of the wafer bar 71.

The flying head slider 18 made in the aforementioned manner is then attached to the tip end of the head suspension 19. At this point, the height Tr of the protection protuberance 49 is set larger than a predetermined height Tp that is to be established when the flying head slider 18 is incorporated into the HDD 11. The flying head slider 18 is subsequently set opposed to an abrasive disk in a condition equivalent to the condition established when the flying head slider 18 is incorporated within the HDD 11.

Figure 15:
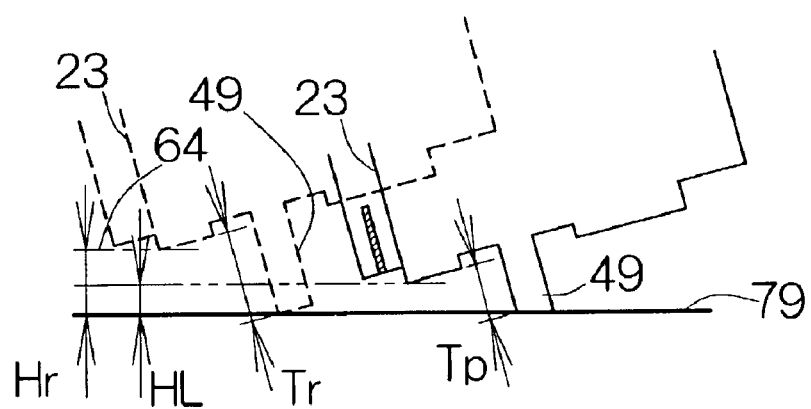
FIG. 15 is an enlarged partial side view of the flying head slider for schematically illustrating the process of adjusting the height of the protection protuberance.

As shown in FIG. 15, when the abrasive disk 79 is driven to rotate at the predetermined revolution speed set for the magnetic recording disk 13 of the HDD 11, the flying head slider 18 is forced to fly above the surface of the abrasive disk 79 by a predetermined flying height Hr that is to be established when the flying head slider 18 is incorporated within the HDD 11. As described above, the trailing end or edge of the slider body 23 moves in the orbit plane 64 in parallel with the surface of the abrasive disk 79. On the other hand, when the abrasive disk 79 is driven to rotate at a set revolution speed smaller than the aforementioned predetermined revolution speed, the flying head slider 18 is forced to fly low at a lower flying height HL smaller than the aforementioned predetermined flying height Hr. The flying head slider 18 is allowed to get closer to the surface of the abrasive disk 79, so that the tip or top of the protection protuberance 49 is brought into contact with the rotating abrasive disk 79. The protection protuberance 49 abrades because of the contact or slide between the top of the protection protuberance 49 and the rotating abrasive disk 79. In this manner, the protection protuberance 49 is shortened to the predetermined height Tp. The height of the protection protuberance 49 is thus adjusted.

When the abrasive disk 79 rotates at the set revolution speed, the flying head slider 18 is allowed to fly above the surface of the abrasive disk 79 exactly by the lower flying height HL. The accurate flying height HL of the flying head slider 18 contributes to establishment of the predetermined height Tp of the protection protuberance 49 without any dimensional errors. The flying height of the top of the protection protuberance 49 can be set based on the difference between the predetermined flying height Hr and the lower flying height HL. In the HDD 11, the top of the protection protuberance 49 is allowed to reliably keep the predetermined flying height Hr above the surface of the magnetic recording disk 13.

The aforementioned abrasion of the protection protuberance 49 may be effected prior to assembly of the flying head slider 18 into the HDD 11. It should be noted that the aforementioned abrasion may be effected within the HDD 11. In the latter case, the magnetic recording disk 13 functions as the abrasive disk in the HDD 11.

The aforementioned protection protuberance 49 may be applied to any types of flying head sliders other than the above-described flying head slider 18. In addition, the flying head slider 18 may be incorporated into any types of recording disk drive or storage device, including a magnetic disk drive such as the aforementioned HDD 11.

What is claimed is:

1. A recording medium drive comprising:
   a recording medium;
   a head slider opposing a medium-opposed surface to the recording medium and taking a predetermined flying attitude during flight above the recording medium;
   a protection film layered over a trailing end surface of a slider body within the head slider;
   a head element embedded within the protection film and opposing a tip end to the recording medium; and
   a protection protuberance standing on the medium-opposed surface upstream of the head element, wherein said protection protuberance flies above the recording medium at a flying height smaller than a flying height established by the head element when thermal expansion is induced in the protection film.

2. The recording medium drive according to claim 1, wherein said protection protuberance gets smaller in a lateral direction as approaching the leading end of the head slider.

3. The recording medium drive according to claim 2, wherein a front wall surface is defined on the protection protuberance, said front wall surface extending from a front datum line perpendicular to the medium-opposed surface to a rear datum line perpendicular to the medium-opposed surface at a position closer to the trailing end surface than the front datum line.

4. The recording medium drive according to claim 2, wherein first and second front wall surfaces are defined on the protection protuberance, said first and second front wall surfaces respectively extending from first and second datum lines both perpendicular to the medium-opposed surface to a third datum line perpendicular to the medium-opposed surface at a position closer to the leading end of the head slider than the first and second datum lines.

5. The recording medium drive according to claim 4, wherein said protection protuberance is located within a depression defined in an air bearing surface over the medium-opposed surface.

6. The recording medium drive according to claim 5, wherein a size of the protection protuberance is set enough to block airflow directed to the head element over an entire range of an incident angle of the airflow, said incident angle being variable because of change in the flying attitude of the head slider.

7. The recording medium drive comprising:
   a recording medium;
   a head slider opposing a medium-opposed surface to the recording medium and taking a predetermined flying attitude during flight above the recording medium;
   a protection film layered over a trailing end surface of a slider body within the head slider;
   a head element embedded within the protection film and opposing a tip end to the recording medium; and
   a protection protuberance standing on the medium-opposed surface upstream of the head element;
   wherein said protection protuberance is located within a depression defined in an air bearing surface over the medium-opposed surface and said protection protuberance flies above the recording medium at a flying height smaller than a flying height established by the head element.

8. The recording medium drive according to claim 7, wherein a size of the protection protuberance is set enough to block airflow directed to the head element over an entire range of an incident angle of the airflow, said incident angle being variable because of change in the flying attitude of the head slider.

9. A head slider comprising:
   a slider body;
   a protection film layered over a trailing end surface of the slider body;
   a head element embedded within the protection film and exposing a tip end at an air bearing surface; and
   a protection protuberance standing on the air bearing surface closer to a leading end of the slider body than the head element,
   wherein said protection protuberance has a ridge extending in a direction perpendicular to the air bearing surface and said protection protuberance gets smaller in a lateral direction approaching the ridge.

10. The head slider according to claim 9, wherein a size of the protection protuberance is set enough to block airflow directed to the head element over an entire range of an incident angle of the airflow, said incident angle being variable because of change in the flying attitude of the head slider.

11. A head slider comprising:
   a slider body;
   a protection film layered over a trailing end surface of the slider body;

a head element embedded within the protection film and exposing a tip end at an air bearing surface; and a protection protuberance standing on the air bearing surface closer to a leading end of the slider body than the head element, wherein a front wall surface is defined on the protection protuberance, and said front wall surface extends from a front ridge extending in a direction perpendicular to the air bearing surface to a rear ridge extending in the direction perpendicular to the air bearing surface, the rear ridge being located closer to the trailing end surface than the front ridge.

12. The head slider according to claim 11, wherein a size of the protection protuberance is set enough to block airflow directed to the head element over an entire range of an incident angle of the airflow, said incident angle being variable because of change in the flying attitude of the head slider.

13. A head slider comprising:

a slider body;

a protection film layered over a trailing end surface of the slider body;

a head element embedded within the protection film and exposing a tip end at an air bearing surface; and a protection protuberance standing on the air bearing surface closer to a leading end of the slider body than the head element, wherein first and second front wall surfaces are defined on the protection protuberance, and said first and second front wall surfaces respectively extend from first and second ridges both extending in a direction perpendicular to the air bearing surface to a third ridge extending in the direction perpendicular to the air bearing surface at a position closer to the leading end of the slider body than the first and second ridges.

14. The head slider according to claim 13, wherein a size of the protection protuberance is set enough to block airflow directed to the head element over an entire range of an incident angle of the airflow, said incident angle being variable because of change in the flying attitude of the head slider.

15. A head slider comprising:

a slider body;

a protection film layered over a trailing end surface of the slider body;

a head element embedded within the protection film and exposing a tip end at an air bearing surface;

a depression defined in the air bearing surface at a position closer to a leading end of the slider body than the head element; and a protection protuberance standing within the depression on the slider body and defining a tip end protruding from a level of the air bearing surface.

16. The head slider according to claim 15, wherein a size of the protection protuberance is set enough to block airflow directed to the head element over an entire range of an incident angle of the airflow, said incident angle being variable because of change in the flying attitude of the head slider.

* * * * *